United States Patent
Leidel et al.

(10) Patent No.: US 11,845,619 B2
(45) Date of Patent: Dec. 19, 2023

(54) CLAMP DEVICE AND CONTAINER-HANDLING APPARATUS

(71) Applicant: KRONES AG, Neutraubling (DE)

(72) Inventors: Marco Leidel, Neutraubling (DE); Christoph Brandl, Neutraubling (DE); Bruno Landler, Neutraubling (DE)

(73) Assignee: KRONES AG, Neutraubling (DE)

( * ) Notice: Subject to any disclaimer, the term of this patent is extended or adjusted under 35 U.S.C. 154(b) by 156 days.

(21) Appl. No.: 17/324,466

(22) Filed: May 19, 2021

(65) Prior Publication Data
US 2021/0362961 A1 Nov. 25, 2021

(30) Foreign Application Priority Data
May 20, 2020 (DE) ...................... 10 2020 113 601.3

(51) Int. Cl.
*B25J 15/08* (2006.01)
*B65G 47/90* (2006.01)

(52) U.S. Cl.
CPC .............. *B65G 47/90* (2013.01); *B25J 15/08* (2013.01); *B65G 2201/0235* (2013.01)

(58) Field of Classification Search
CPC .. B65G 47/90; B65G 2201/0235; B25J 15/08; B25J 15/0273; B25J 15/0028
USPC ........................ 294/81.61, 81.62, 106, 119.1
See application file for complete search history.

(56) References Cited

U.S. PATENT DOCUMENTS

| 4,093,296 A * | 6/1978 | Itoh ........................ B65G 47/90 294/90 |
| 4,544,193 A * | 10/1985 | Dunn ..................... B25J 15/026 294/86.4 |
| 4,874,194 A * | 10/1989 | Borcea ................ C02F 1/46176 294/207 |
| 7,431,364 B2 * | 10/2008 | Huang .................. B81C 99/002 294/99.1 |
| 9,444,315 B2 * | 9/2016 | Saito ..................... H02K 15/085 |
| 10,695,914 B2 * | 6/2020 | Schiepp ................ B25J 9/1085 |

(Continued)

FOREIGN PATENT DOCUMENTS

| CN | 104002310 A | 8/2014 |
| CN | 107735354 A | 2/2018 |

(Continued)

OTHER PUBLICATIONS

First Office Action dated Sep. 2, 2022 from corresponding Chinese application No. 202110546254.3, 9 pages.

(Continued)

*Primary Examiner* — Ronald P Jarrett
(74) *Attorney, Agent, or Firm* — Haynes and Boone, LLP

(57) ABSTRACT

A clamp device for retaining a container in a container-handling apparatus, for example for retaining a drinks container at a neck portion or at a body portion, includes two clamp arms, which each have a retaining portion for retaining the container which is to be retained, and at least one prestressing element for prestressing the retaining portions towards one another, wherein for the purpose of adjusting the distance which is present between the retaining portions, the clamp arms are designed in a displaceable manner in relation to the prestressing of the at least one prestressing element. A container-handling apparatus having at least one clamp device is also described.

20 Claims, 7 Drawing Sheets

(56) References Cited

U.S. PATENT DOCUMENTS

| | | | |
|---|---|---|---|
| 2005/0284731 A1 | 12/2005 | Hartness et al. | |
| 2011/0266409 A1* | 11/2011 | Warrick | F16B 2/12 248/316.5 |
| 2014/0175819 A1 | 6/2014 | Wilson et al. | |
| 2019/0176343 A1* | 6/2019 | Landler | B65G 47/90 |
| 2019/0275683 A1* | 9/2019 | Bright | B26F 3/004 |

FOREIGN PATENT DOCUMENTS

| | | |
|---|---|---|
| CN | 108 658 026 A | 10/2018 |
| CN | 109895126 A | 6/2019 |
| DE | 10 2005 014 838 A1 | 10/2006 |
| DE | 10 2006 012 020 A1 | 9/2007 |
| DE | 10 2012 218 204 A1 | 4/2014 |
| DE | 10 2014 116 259 A1 | 5/2016 |
| DE | 10 2015 218 204 A1 | 3/2017 |
| DE | 10 2015 223999 A1 | 6/2017 |
| DE | 10 2017 129 506 A1 | 6/2019 |
| EP | 0 939 044 A1 | 11/2003 |
| EP | 2 143 674 A2 | 1/2010 |
| EP | 2 511 205 A2 | 10/2012 |
| JP | H01267214 A | 10/1989 |

OTHER PUBLICATIONS

German Office Action dated Mar. 9, 2021 for German Application No. DE 10 2020 113 601.3, 8 pages.
Extended European Search Report dated Oct. 13, 2021 from corresponding European application No. 21174992.4, 7 pages.

* cited by examiner

CLAMP DEVICE AND CONTAINER-HANDLING APPARATUS

CROSS-REFERENCE TO RELATED APPLICATIONS

This application claims priority from German Patent Application No. DE 10 2020 113 601.3, filed on May 20, 2020 in the German Patent and Trademark Office, the disclosure of which is incorporated herein by reference in its entirety.

BACKGROUND

Technical Field

The present invention relates to a clamp device for retaining a container in a container-handling apparatus, for example for retaining a drink container at a neck portion or at a body portion in order to be transported through the container-handling apparatus or in handling portions of the container-handling apparatus, for transfer from one handling portion to a following handling portion, and also relates to a container-handling apparatus.

Related Art

It is common practice in bottling plants for the containers which are to be filled in each case, or already filled containers, to be retained by means of clamp devices and, in this way, transported through the individual handling stations of the container-handling apparatus. Different clamp devices, by means of which the respective containers which are to be handled are retained in different ways, are known here.

For example, passive clamp devices, which are prestressed elastically merely as a result of the respective container being pushed into the clamp device, and then retain the respective container, are known. DE 10 2012 218 204 A1 discloses such a clamp for gripping containers. The clamp here is in a fixed position. In order for a container to be gripped, the latter has to be pushed into the clamp. In the process, the stiff gripping arms are spread outwards, and therefore the container has to be moved counter to the closing force of the gripping arms, said force arising on account of the spreading action of the clamp. As a result, the container is subjected to a high force when being pushed in, and therefore such retaining devices are not suitable for gripping or retaining fragile and/or easily deformable and thin-walled containers. There is at least a tendency for the surfaces of the respective containers to get scratched, and this can reduce the quality of the containers.

Also known are active clamp devices, in the case of which the respective retaining portions of the clamp device are actively opened and closed by means of an actuator. Such active clamp devices serve, in particular, to make it possible for the respective containers to be received reliably and carefully from a preceding clamp device or to ensure that the containers are transferred just as reliably and carefully to a following clamp device. In particular, the active opening and closing of the respective clamp device can avoid increased friction on the respective container, which could result, for example, in the container getting scratched, and, on the other hand, it is possible to set a predetermined retaining force of clamping force which can be kept within a predetermined container-dimension tolerance range. Such active clamp devices are made up of a multiplicity of individual parts, for example clamp arms, bushings, spring elements, prestressing elements and corresponding connecting elements for securely connecting the aforementioned parts. Clamp devices constructed in this way therefore require effort to clean and involve a correspondingly large amount of effort to manufacture.

EP 0 939 044 A1 discloses a bottle gripper which has a gripping device having two gripping arms which can be moved into a retaining position or a release position by means of a control cam. The control cam interacts with an abutment surface, which is formed on each gripping arm, and the abutment surface is designed in the form of a constituent part of an elastic pad, which is arranged on the respective gripping arm.

In order to reduce the complexity of an active clamp device and, at the same time, to make it possible for the clamp arms of the clamp device to be in a predetermined position, for example a closed position, when in a basic state, it is known for the clamp device to be provided with means which subject the clamp arms to prestressing in order thus to prestress the clamp arms into the predetermined position.

EP 2 143 674 A2 discloses an active clamp device which is intended for retaining containers and in the case of which two gripping arms or clamp arms are retained in an open position by separate magnet arrangements. The clamp arms have rearwardly oriented closing levers, which interact with a closing cam, which is arranged therebetween, in order to move the clamp arms out of the open position into a closed position.

DE 10 2005 014 838 A1 discloses an active clamp device for retaining vessels using two clamp arms, which can be moved relative to one another for opening and closing purposes. In order to make it possible for the vessels to be retained reliably, one gripping arm of the clamp is of dimensionally stable design and the other gripping arm is of elastic design. The gripping arms are prestressed into an open position by means of magnets arranged thereon and are pivoted into the closed position by means of a control cam.

It is basically the case with conventional clamp devices which involve the clamp arms being prestressed into a predetermined position that the clamp arms are each arranged in a pivotable manner about a pivot axis. In other words, the clamp arms of the clamp device can be changed over between an open position and a closed position by the clamp arms undergoing pivoting or rotation. For the purpose of closing the clamp device, the clamp arms are pivoted or rotated about the axes of rotation such that the retaining portions of the clamp arms are rotated towards one another. Correspondingly, for the purpose of opening the clamp, it is necessary for the clamp arms, and therefore the retaining portions, to be rotated away from one another. The rotary arrangement of the clamp arms means that, in particular when the clamp device is provided to retain containers of different sizes, in particular different types of container with different container diameters, there can be an offset of the centre axis of the containers between the individual types of container. In other words, it is possible for the centre axes of different types of container in carousels, when said containers are being retained by the clamp device, to be located for example at different pitch diameters.

This can result in a container-handling apparatus which is aimed at the pitch circle of a first type of container no longer being suitable for handling containers of a different type, it therefore being necessary for the container-handling apparatus to be adapted, for example in respect of the position of a filler tube. The pivoting of the clamp arms about the axes of rotation at least means that, for containers with different diameters, a resultant retaining force, to which the container is subjected by a clamp arm, has differently oriented force vectors. This can result in the situation where, when the container retained in the clamp device is subjected to an external force, a first type of container is retained reliably in the clamp device and a different type of container reacts differently, for example is displaced in position by the external force or, in the worst case, is caused to slip out of the retaining portions of the clamp device.

JP 1267214 A2 discloses a typical example of a clamp device which has pivotable clamp arms and in the case of which the centre axes of different types of container are retained at pitch circles with different diameters, and also the force vectors of the resultant retaining forces are oriented differently in each case.

SUMMARY

An improved clamp device for retaining a container in a container-handling apparatus, for example for retaining a drink container at a neck portion or at a body portion, and also an improved container-handling apparatus is described herein according to various embodiments.

A clamp device for retaining a container in a container-handling apparatus, for example for retaining a drink container at a neck portion or at a body portion is provided herein according to certain embodiments. Advantageous developments can be gathered from the description and the figures.

Accordingly, embodiments of the invention propose a clamp device for retaining a container in a container-handling apparatus, for example for retaining a drink container at a neck portion or at a body portion, comprising two clamp arms, which each have a retaining portion for retaining the container to be retained, and also comprising at least one prestressing element for prestressing the retaining portions towards one another and particularly at a predetermined distance from one another. The clamp device is also characterized in that, for the purpose of adjusting the distance which is present between the retaining portions, the clamp arms are designed in a displaceable manner in relation to the prestressing of the at least one prestressing element.

Since, for the purpose of adjusting the distance which is present between the retaining portions, the clamp arms are designed in a displaceable manner in relation to the prestressing of the at least one prestressing element, it is possible to achieve the situation where different types of containers, which have different diameters in that region of the container in which the latter is retained by the retaining regions, can have their centre axis positioned at an essentially constant point in relation to the clamp device.

This means that it is possible, for example in the case of a carousel-type transporting apparatus having the clamp device, for the centre longitudinal axes of the different types of container to be positioned at an essentially constant pitch diameter while the containers are being retained by the clamp device. In addition, since the retaining portions are designed in a displaceable manner, in other words are designed for translatory movement, rather than being pivoted, as is the case with conventional clamp devices, this makes it possible for the resultant retaining forces to which different types of container are subjected by a clamp arm while being retained are oriented in essentially the same direction. This means that types of container with different diameters are always retained in essentially the same way by the clamp device, and therefore, when a container retained in the clamp device is subjected to an external force, the expectation is that different types of container will react with a similar, or even identical, reaction. Consequently, a particularly reliable retaining action is also achieved for different types of containers.

According to an embodiment, the clamp arms are designed for parallel displacement along a displacement direction. In other words, a first one of the two clamp arms is designed for parallel displacement in the displacement direction and a second one of the two clamp arms is designed for parallel displacement in the same displacement direction. The clamp arms therefore have a common displacement axis, in relation to which they are designed for parallel displacement in each case.

There is generally a defined distance between the retaining portions along the displacement direction.

According to another embodiment, a common prestressing element is provided for prestressing the two clamp arms. As an alternative, or in addition, it is possible in each case for a separate prestressing element to be provided for each of the clamp arms.

In order to achieve a particularly straightforward construction of the clamp device and, in addition, to make it possible for the clamp device to be manufactured in a particularly straightforward manner, the clamp arms and the prestressing element can be formed in one piece with one another. This can additionally reduce the effort required for cleaning the clamp device in comparison with multi-part clamp devices.

It has been found to be advantageous if the clamp arms are guided in a displaceable manner on a clamp carrier in each case via a guide element, wherein typically the guide elements are guided in a displaceable manner, for example in a linearly displaceable manner, in a respective guide groove of the clamp carrier in each case. The guide elements here are guided generally in the displacement direction of the clamp arms, and therefore the direction in which the retaining portions can be moved towards one another and away from one another can be predetermined in a straightforward manner.

According to a further embodiment, an actuating unit is provided for actively moving the retaining portions away from the predetermined distance. The clamp device then constitutes an active clamp device, in the case of which the respective retaining portions of the clamp device can be actively opened or closed by means of the actuating unit.

The actuating unit is generally designed such that displacement of a displaceable actuating member of the actuating unit, for example of an actuating member which can be displaced in the direction of a longitudinal centre axis of the clamp device, causes displacement of the clamp arms, wherein generally a displacement direction of the actuating member is oriented transversely in relation to the displacement direction of the clamp arms.

It is thus possible, for example when the clamp device is used in a carousel-type transporting apparatus, for the movement direction of the actuating member to be oriented essentially radially in relation to a central axis of rotation of the transporting apparatus, whereas the displacement direction of the clamp arms can be oriented essentially tangentially in relation to the axis of rotation.

According to a further embodiment, the actuating member is coupled to the clamp arms in each case via a coupling member which is arranged in a pivotable manner on the actuating member and in a pivotable manner on the respective clamp arm.

It is also possible for the actuating member to comprise at least one rack portion and for the clamp arms each to have a rack portion, wherein each of the two clamp arms has its rack portion coupled to the at least one rack portion of the actuating member in each case via a coupling gearwheel.

According to a further embodiment, for the purpose of providing the pivotable attachment of the coupling member to the clamp arm, the coupling member is arranged in a pivotable manner on the guide element of the clamp arm. In other words, the coupling member is arranged in a pivotable manner on the respective clamp arm in that the coupling member is arranged in a pivotable manner on the guide element. This is advantageous in particular in respect of the introduction of force from the actuating member, via the coupling member, to the clamp arm.

According to another embodiment, the retaining portions are prestressed at a predetermined distance from one another and the predetermined distance corresponds generally to an open position of the retaining portions, wherein the retaining portions can be moved into a closed position by displacement of the actuating member. This can achieve the situation where the clamp device can be moved into the closed position merely by active activation via the actuating member.

As an alternative, the retaining portions are prestressed at a predetermined distance from one another and the predetermined distance can correspond to a closed position of the retaining portions and the retaining portions can be moveable into an open position by displacement of the actuating member. In this embodiment, containers retained in the clamp are already retained reliably on account of the prestressing, wherein release of the retained container is made possible by active activation of the actuating member.

In order for the distance between the retaining portions to be predetermined particularly precisely by the actuating member, the actuating member can have an interaction element for interacting with a predetermining device for predetermining the position of the actuating member. The interaction element is generally designed in the form of a sliding element and/or of a roller, generally designed for sliding and/or rolling on a guide curve. It has been found to be advantageous here if the interaction element is arranged on a side of the actuating member which is directed away from the clamp arms.

According to a further embodiment, the clamp arms are attached to the guide element in each case such that rotation is prevented. The rotation-prevention means between the clamp arm and guide element here is generally in the form of a form fit. The rotation-prevention means can comprise, for example, a pin connection and/or a polygonal contour. As an alternative, or in addition, the clamp arm can be guided on the clamp carrier in each case in two parallel, spaced-apart guide grooves. The guide elements are generally guided in a displaceable manner, but such that rotation is prevented in each case, in a guide groove in the clamp carrier.

According to a further embodiment, the clamp arms and the actuating unit extend essentially in a single plane. In other words, with the clamp device installed on a transporting apparatus of a container-handling apparatus, the clamp arms and the actuating unit are located essentially at the same height position in relation to the transporting apparatus and/or in respect of acceleration due to gravity. This can be advantageous in terms of the amount of installation space which is available for the container-handling apparatus. In particular in the case of container-handling apparatuses in bottling plants, the amount of installation space below and above the height position of the clamp arms is highly constricted. In addition, providing the clamp arms and the actuating unit in a single plane makes it possible to achieve a particularly straightforward construction of the container-handling apparatus. It has been found to be particularly advantageous if the actuating member is arranged in part, typically predominantly, in particular generally essentially entirely, on the side located opposite the retaining portions, as seen in relation to the clamp arms.

According to a further embodiment, the prestressing element has an elastic spring bracket extending from one clamp arm to the other clamp arm, wherein generally the spring bracket is attached to the clamp arms in each case between the retaining portion and a guide-element-attachment portion, or the spring bracket is attached to the respective clamp arm in each case in the region of the retaining portion. It can be advantageous here for the spring bracket and the clamp arms to extend essentially in a single plane. The spring bracket can generally also have a stiffening element for stiffening a central region of the spring bracket. The clamp arms and the spring bracket are typically formed in one piece.

A container-handling apparatus, for example a container-handling apparatus for a bottling plant is also described herein according to various embodiments. Developments can be gathered from the present description and the figures.

Accordingly, embodiments of the invention propose a container-handling apparatus comprising a transporting apparatus for transporting a container. The container-handling apparatus is characterized in that the transporting apparatus has at least one clamp device according to one of the preceding embodiments.

Since the transporting apparatus has at least one clamp device according to one of the preceding embodiments, the advantages and effects described in relation to the clamp device can also be achieved in an analogous manner by the container-handling apparatus.

In particular if the clamp device is configured to retain the container at a body of the container, for example to provide assistance in a container-handling apparatus in which the containers are transported by means of the so-called base-handling principle, it has been found to be advantageous if the clamp device for retaining a container has a plurality of pairs of clamp arms, which, when the clamp device is installed, are spaced apart from one another in heightwise direction.

The clamp device generally has an upper pair of clamp arms and a lower pair of clamp arms, which are spaced apart from one another by a predetermined distance in the heightwise direction. The clamp device can have a common actuating member for the two clamp-arm pairs or, as an alternative, a separate actuating member for each clamp-arm pair. In the latter case, the clamp arms of one pair and the associated actuating member can be arranged essentially in a single plane or can extend essentially in a single plane. In other words, the two clamp arms of the first pair together with the actuating member thereof extend in a first plane, and the two clamp arms of the further pair together with the actuating member thereof extend in a further plane, which is spaced apart from the first plane, wherein the first plane and the further plane are oriented parallel to one another.

BRIEF DESCRIPTION OF THE FIGURES

Further embodiments of the invention will be explained in more detail by the following description of the figures, in which.

DETAILED DESCRIPTION

Exemplary embodiments will be described hereinbelow with reference to the figures. Identical, similar or equivalent elements are denoted in the different figures by identical reference signs, and a repeated description of these elements is dispensed with in some cases in order to avoid redundancies.

Figure 1:
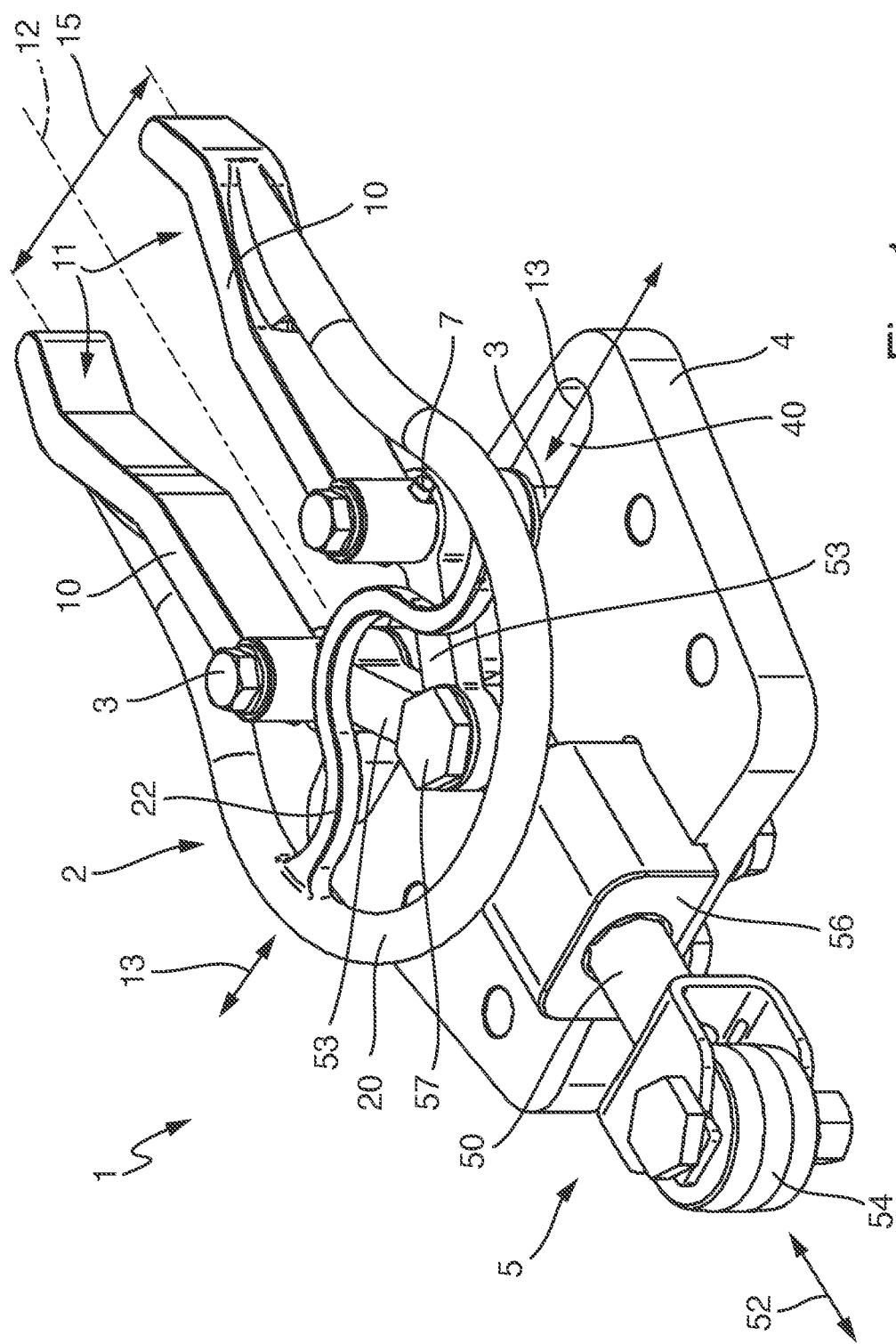
FIG. 1 shows, schematically, a perspective lateral plan view of a clamp device for retaining a container in a container-handling apparatus according to a first embodiment.

FIG. 1 shows, schematically, a perspective lateral plan view of a clamp device 1 for retaining a container in a container-handling apparatus according to a first embodiment. The clamp device 1 comprises two clamp arms 10, which are arranged opposite one another in relation to a longitudinal centre axis 12 of the clamp device 1 and each have a retaining portion 11 for retaining the container which is to be retained. The clamp arms 10 are prestressed towards one another by means of a prestressing element 2.

Correspondingly, the clamp arms 10 are prestressed at a predetermined distance 15 from one another, wherein the predetermined distance 15 corresponds to a closed position of the clamp arms 10 or of the retaining portions 11.

For the purpose of adjusting the distance 15 which is present between the retaining portions 11, the clamp arms 10 are designed in a displaceable manner in relation to the prestressing of the prestressing element 2.

The clamp arms 10 here are guided in a displaceable manner, in a displacement direction 13, on a clamp carrier 4 in each case via a guide element 3. The displacement direction 13 is predetermined by guide grooves 40, which are arranged in the clamp carrier 4 and in which a respective one of the guide elements 3 can be moved in a translatory manner. The guide elements 3 are prevented from rotating in the guide grooves 40. In other words, rotation of the guide elements 3 is prevented by the guidance in the guide grooves 40. Furthermore, the clamp arms 10 are arranged on the guide elements 3 in each case such that rotation is prevented. The rotation-prevention means is formed here by a pin connection 7 between the respective clamp arm 10 and its guide element 3.

The clamp device 1 also has an actuating unit 5, which is designed to move the retaining portions 11 actively away from the distance 15 which is predetermined by the prestressing element 2. In other words, the actuating unit 5 can alter the distance 15 between the retaining portions 11.

The actuating unit 5 here has an actuating member 50, which is displaceable in a displacement direction 52, which in the present case is oriented parallel to the centre longitudinal axis 12 or corresponds to said axis, and is guided on the clamp carrier 4 via a linear guide 56.

The actuating member 50 is coupled to the clamp arms 10 in each case via a coupling member 53 which is arranged in a pivotable manner on the actuating member 50 and in a pivotable manner on the respective clamp arms 10.

The pivotable attachment between the actuating member 50 and the coupling members 53 is provided by means of a bolt connection 57. The pivotable attachment of the coupling members 53 to the clamp arms 10 is provided in that each coupling member 53 is arranged in a pivotable manner on the respective guide element 3 of the respective clamp arms 10.

As a result of the above described attachment of the actuating member 50 to the clamp arms 10 via the coupling members 53 and the guidance of the clamp arms 10 along the guide grooves 40 via the guide elements 3, it is possible for a translatory movement of the actuating member 50 in the displacement direction 52 to be transformed into a translatory movement of the clamp arms 10 in a displacement direction 13.

The actuating member 50 also has an interaction element for interacting with a predetermining device for predetermining the position of the actuating member 50, in this case in the form of a roller 54. The roller 54 can roll along a guide curve predetermined by the predetermining device.

The clamp arms 10 and the prestressing element 2 are formed in one piece here. According to an alternative embodiment, it is also possible as an alternative, or in addition, for the guide elements 3 to be formed in one piece with the clamp arms 10.

Figure 2:
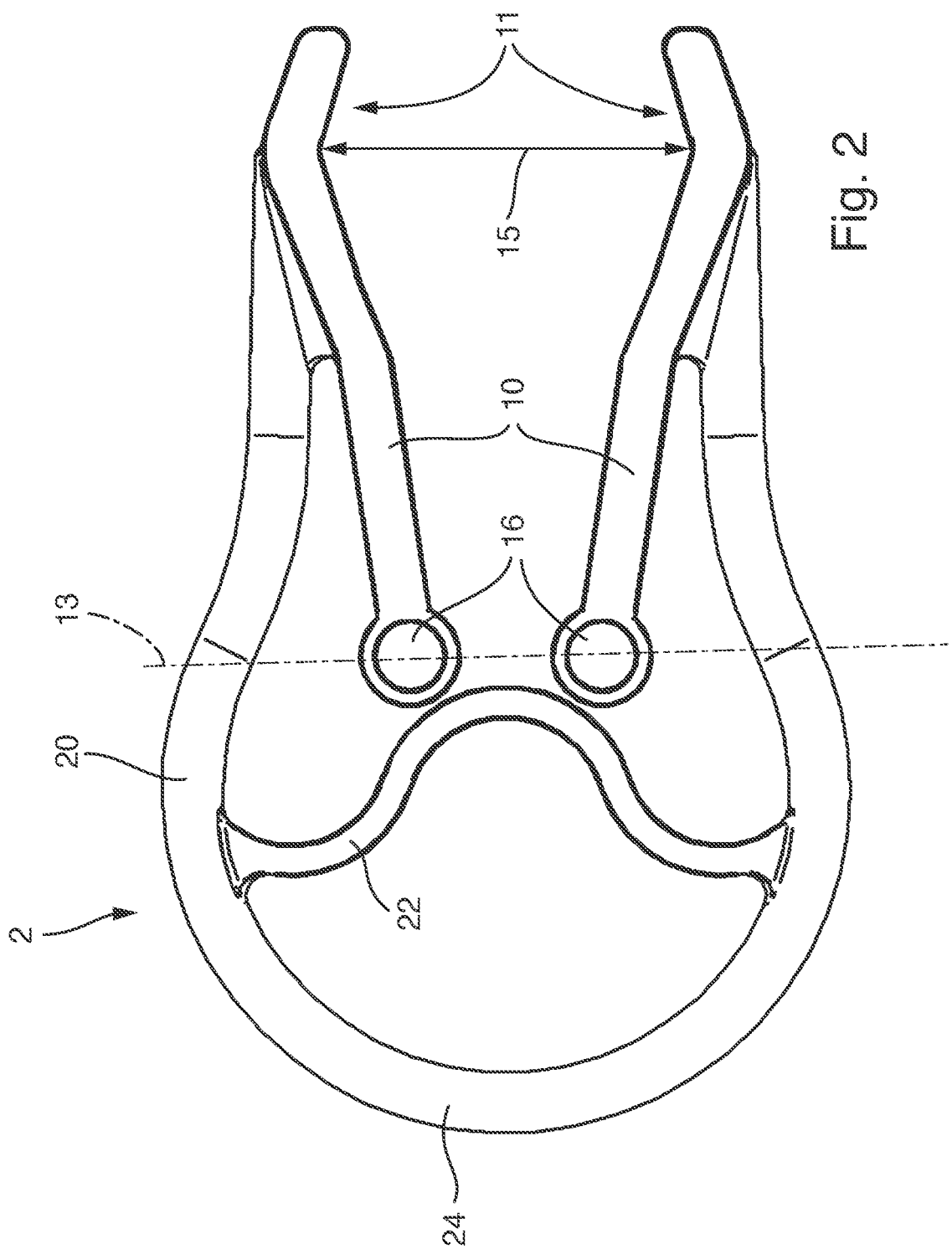
FIG. 2 shows, schematically, a plan view of a single-part clamp of the clamp device from FIG. 1.

FIG. 2 shows, schematically, a plan view of the single-part clamp of the clamp device 1 from FIG. 1, the clamp being formed from the clamp arms 10 and the prestressing element 2.

The single-part clamp can be produced from a plastic, for example polyether ether ketone (PEEK), by means of injection moulding. As an alternative, the single-part clamp or the clamp arms 10 and/or the prestressing element 2 can also have a different plastic or a different material, for example a metal or a metal alloy.

The prestressing element 2 comprises a spring bracket 20, which is attached to the clamp arms 10 in the region of the retaining portions 11 and extends from the clamp arms 10, around the clamp arms 10, on the far side of attachment portions 16, which are arranged at that end of the respective clamp arm 10 which is located opposite the respective retaining portion 11 of the respective clamp arms 10. The guide elements 3 are retained in the attachment portions 16. The attachment portions 16 here have a circular-cylindrical shape, wherein the rotation-prevention means is provided by the pin connection 7 (see FIG. 1). Instead of the circular-cylindrical shape and the pin connection 7, it is also possible for the attachment portions 16 to have a polygonal inner contour, wherein, level with the attachment portions 16, the guide elements 3 likewise have a correspondingly formed polygonal outer contour, and therefore, by virtue of the polygonal inner contour and outer contour interacting, the clamp arms 10 are prevented from rotating about the longitudinal axis of the guide elements 3.

The prestresssing element 2 also comprises a stiffening element 22, which stiffens a central region 24 of the spring bracket 20.

Figure 3:
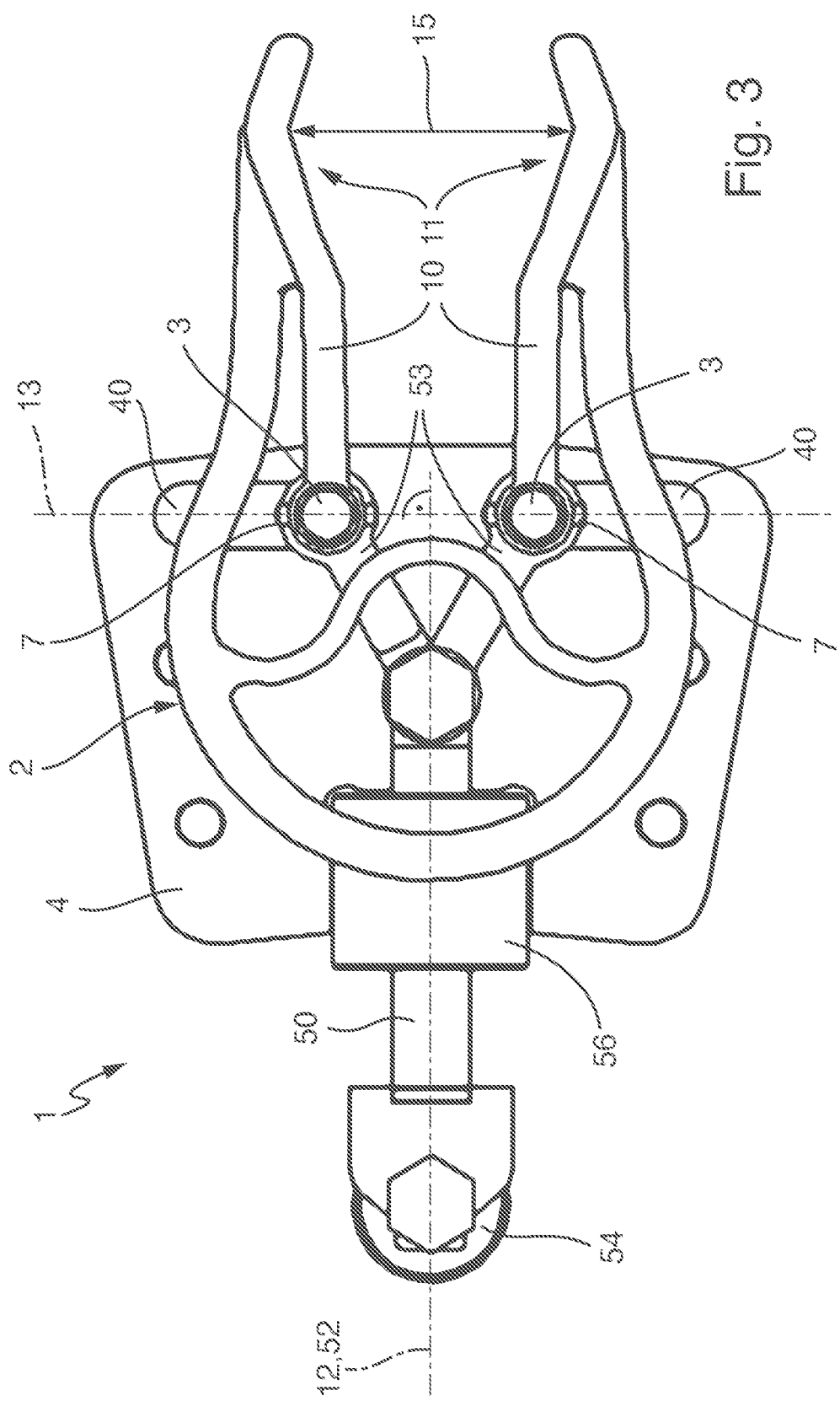
FIG. 3 shows, schematically, a plan view of the clamp device from FIG. 1.

FIG. 3 shows, schematically, a plan view of the clamp device 1 from FIG. 1, from which it can be gathered that the displacement direction 52 of the actuating member 50 and the displacement direction 13 of the clamp arms 10 are oriented orthogonally in relation to one another.

Figure 4:
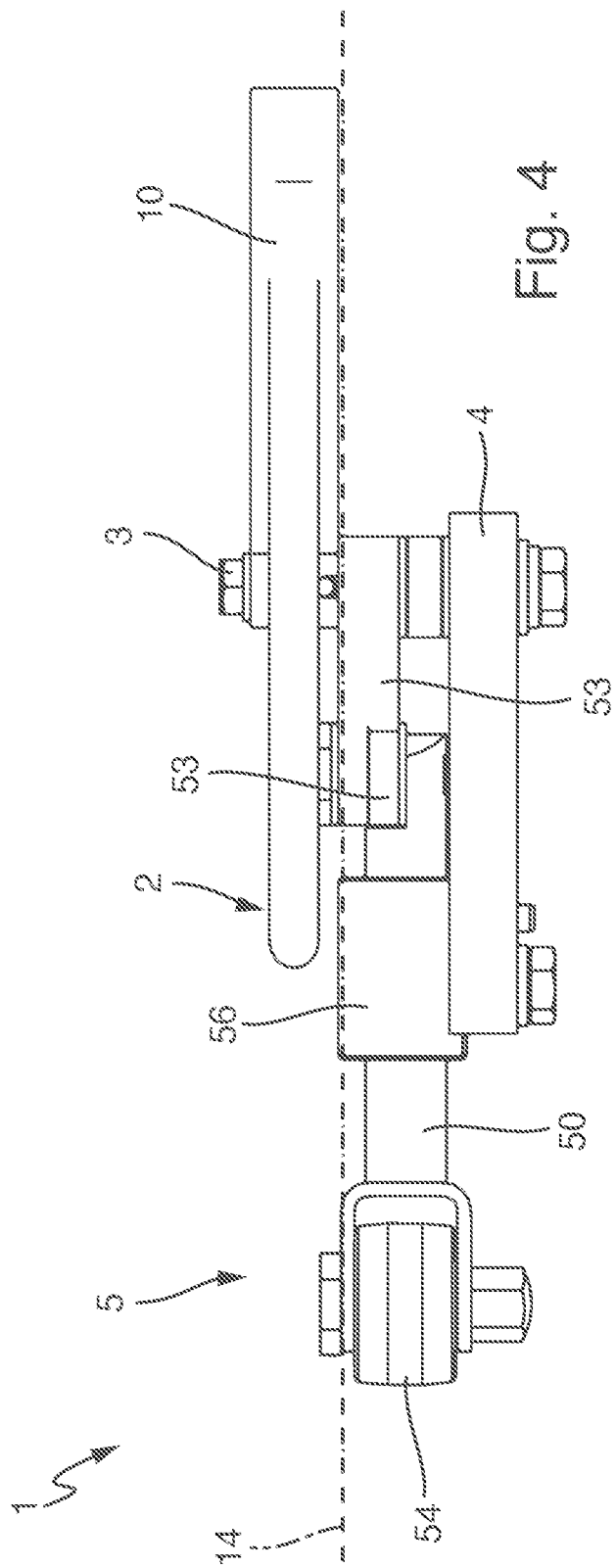
FIG. 4 shows, schematically, a side view of the clamp device from FIG. 1.

FIG. 4 shows, schematically, a side view of the clamp device 1 from FIG. 1, from which it can be gathered that the clamp arms 10 and the actuating unit 5 extend essentially in a single plane 14. In other words, the clamp arms 10 and the actuating unit 5 are arranged essentially at the same height, or are offset in height only to a slight extent. The clamp arms 10 and the actuating unit 5 here are arranged directly one below the other, as seen in the heightwise direction, although, as seen in a direction perpendicular to the heightwise direction, the clamp arms 10 and the actuating unit 5 are partially offset in relation to one another, in other words are arranged one behind the other.

Figure 5:
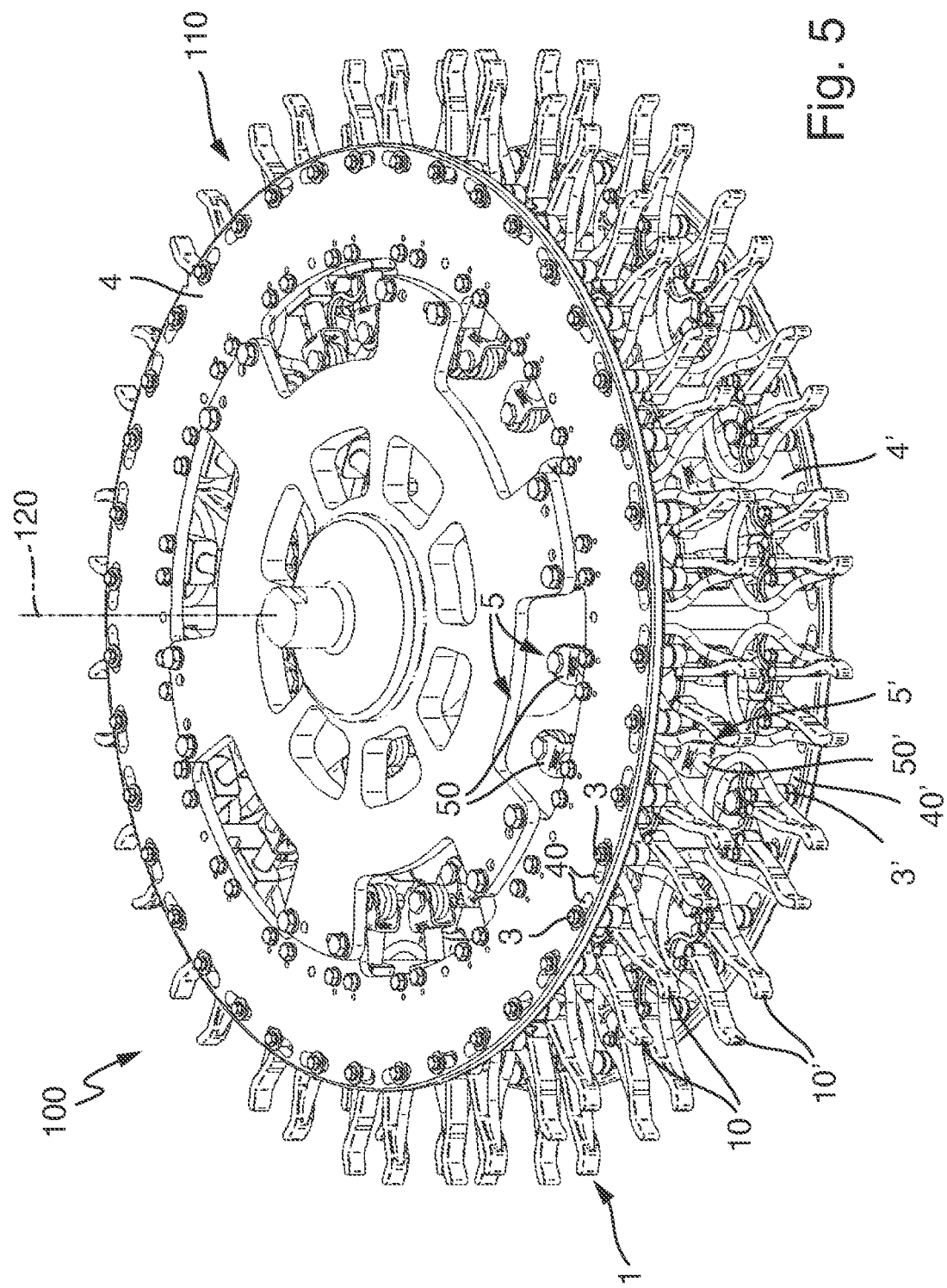
FIG. 5 shows, schematically, a perspective side view of a container-handling apparatus having a multiplicity of clamp devices.

FIG. 5 shows, schematically, a perspective side view of a container-handling apparatus 100 having a multiplicity of clamp devices 1, which correspond essentially to the clamp device from FIG. 1 and are arranged on a transporting apparatus 110, which can be rotated about a vertical axis of rotation 120. In contrast to the clamp device 1 which is shown in FIG. 1, the clamp devices 1 of the container-handling apparatus 100 from FIG. 5 do not have just one pair of clamp arms 10; rather, they have two pairs of clamp arms 10, 10', which are arranged one above the other as seen in the direction of the axis of rotation 120, which corresponds to a heightwise direction of the container-handling apparatus 100.

Each of the clamp pairs 10, 10' has a dedicated actuating unit 5, 5' with a dedicated actuating member 50, 50' in each case.

Figure 6:
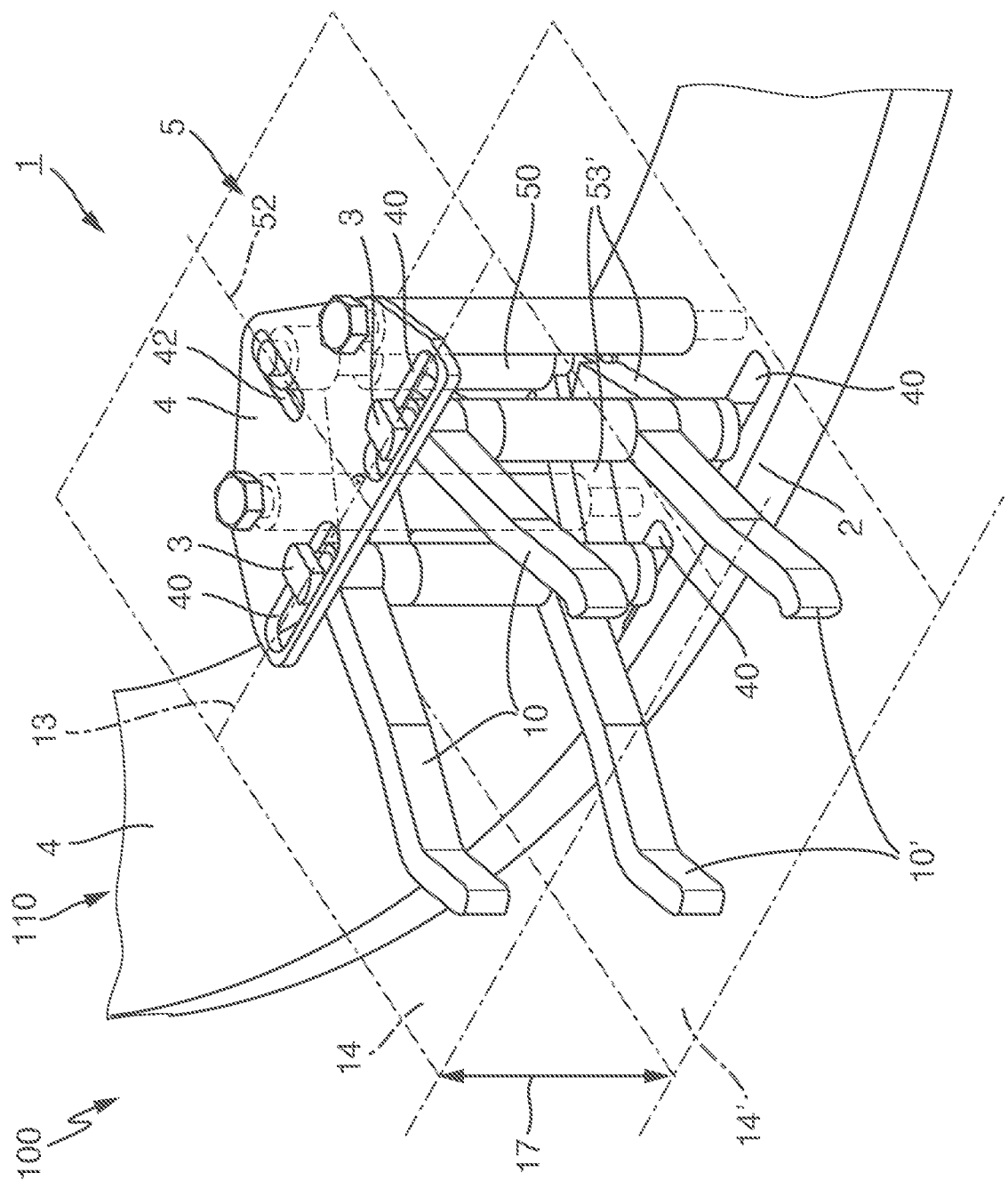
FIG. 6 shows, schematically, a perspective side view of a container-handling apparatus according to a further embodiment.

FIG. 6 shows, schematically, a perspective side view of a container-handling apparatus 100 according to a further embodiment. Instead of a single-part clamp as shown in FIG. 1, the clamp arms 10, 10' of a pair of clamp arms 10, 10' of the clamp device 1 shown here are designed in the form of respectively separate individual parts.

The clamp device 1, once again, is of "double-storey" construction. In other words, it has an upper pair of clamp arms 10 and a further pair of clamp arms 10', this further pair being offset in the heightwise direction below the upper pair. The two pairs have a common actuating unit 5 with a common actuating member 50, wherein the clamp arms 10, 10' are connected to the common actuating member 50 in each case via a dedicated coupling member 53. The actuating member 50 is guided in a displacement direction 52 in a further guide groove 42 of the clamp carrier 4.

In other words, the upper pair of clamp arms 10 extends in a first plane 14, whereas the second pair of clamp arms 10' extends in a further plane 14', which is spaced apart from the first plane 14 by a predetermined height difference 17.

Figure 7:
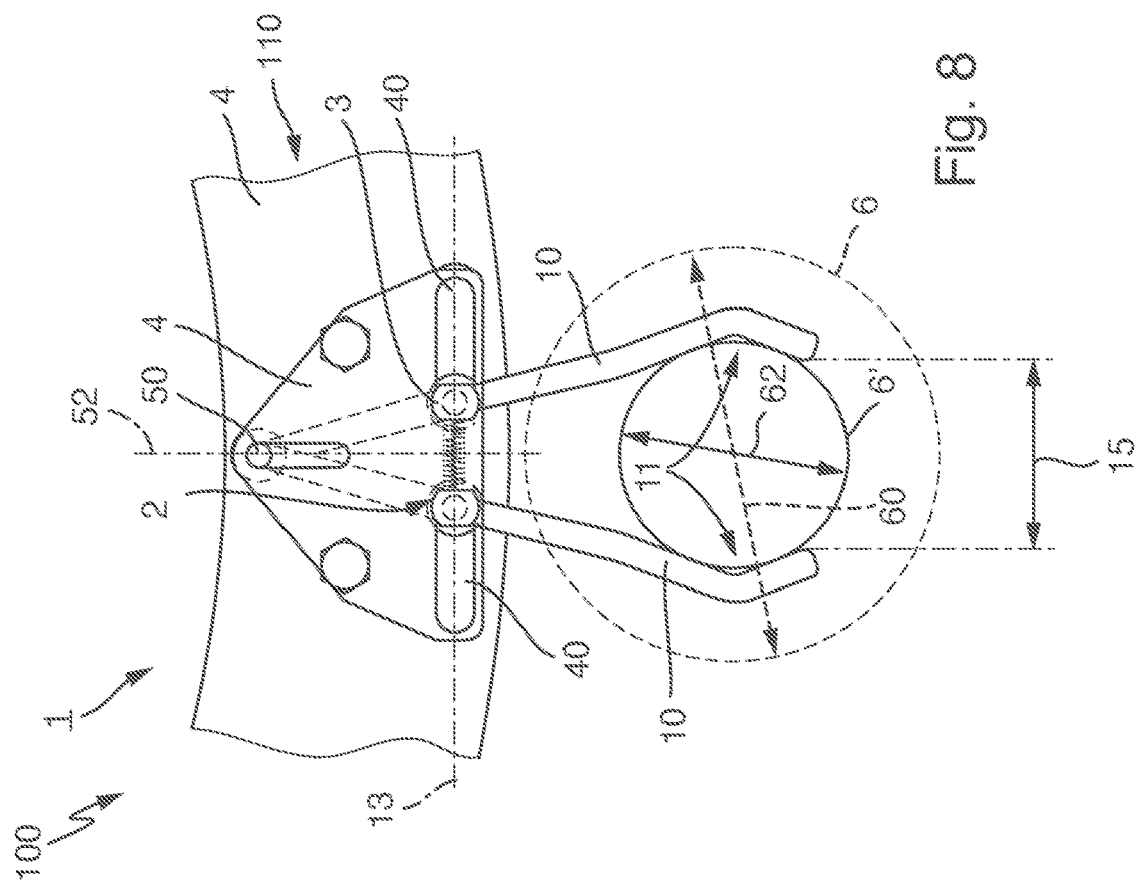
FIG. 7 shows, schematically, a plan view of the container-handling apparatus from FIG. 6.

FIG. 7 shows, schematically, a plan view of the container-handling apparatus from FIG. 6. The actuating member 50 here has been moved counter to the prestressing, which is provided by the prestressing element 2 designed in the form of a tension spring, into a front, first end position, and therefore, on account of the actuating member 50 being coupled to the clamp arms 10, the clamp arms 10 have been displaced in displacement direction 13 out of their rest position, which is predetermined by the prestressing element 2, into the position which is shown in FIG. 7. This position of the clamp arms 10 corresponds to a fully open position of the clamp arms 10 or of the retaining portions 11. The self-adjusting distance 15 here is the maximum possible distance between the retaining portions 11. The distance 15 here allows a container 6 of container diameter 60 to be introduced. In order for the container 6 to be gripped, the force which is retaining the actuating member 50 can be taken from the actuating member 50. Then, the prestressing provided by the prestressing element 2 causes displacement of the clamp arms 10 towards one another, and therefore the clamp arms 10 grip, and retain, the container 6.

Figure 8:
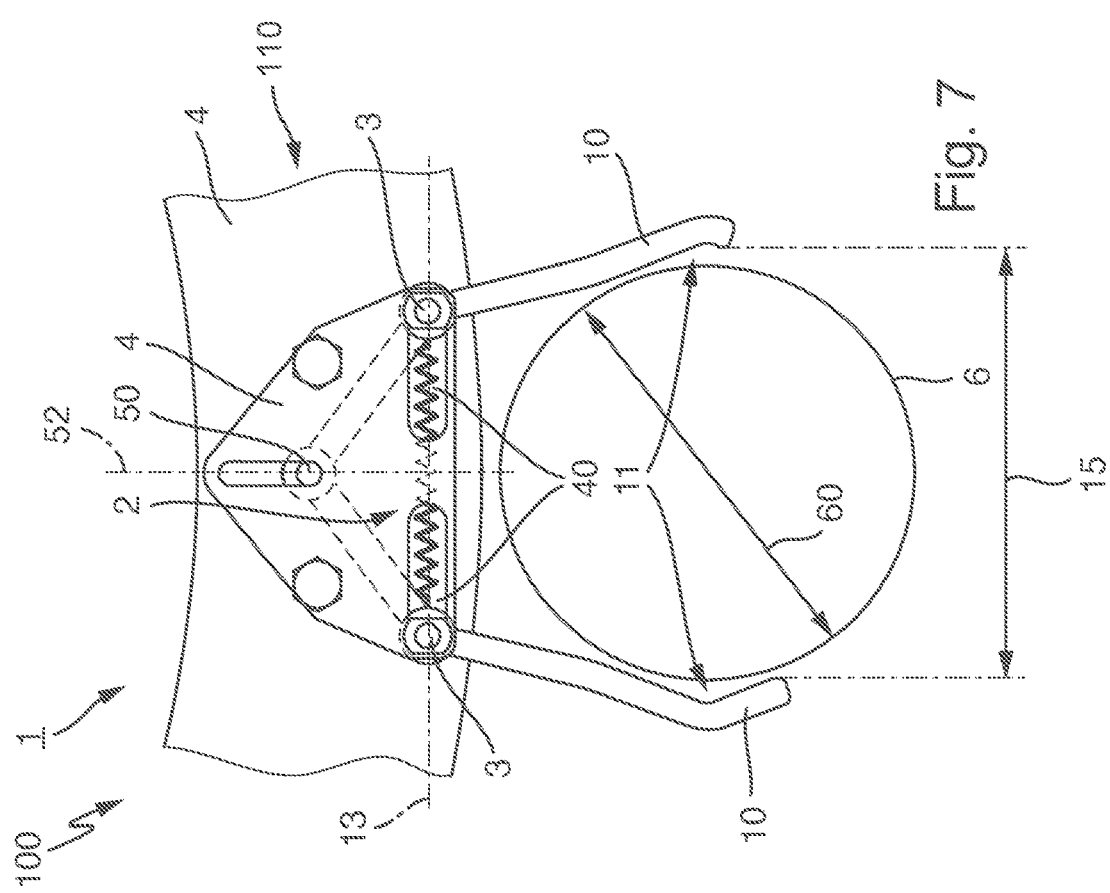
FIG. 8 shows, schematically, a further plan view of the container-handling apparatus from FIG. 6.

FIG. 8 shows, schematically, a further plan view of the container-handling apparatus 100 from FIG. 6. In the illustration of this figure, there is no external force acting on the actuating member 50, and therefore the prestressing element 2 prestresses the clamp arms 10 into a fully closed position. As a result, the retaining portions 11 are correspondingly prestressed at the predetermined distance 15. The clamp arms 10 here use their retaining portions 11 to retain a container 6', which, in comparison with the container 6 from FIG. 7, corresponds to a different type and has a smaller container diameter 62, which in this case corresponds to the smallest possible container diameter with which an appropriately designed container can be retained by the clamp device 1.

If applicable, all the individual features presented in the exemplary embodiments can be combined with one another and/or interchanged without departing from the scope of the invention.

What is claimed is:

1. A clamp device for retaining a container in a container-handling apparatus comprising:
    two clamp arms, wherein each of the two clamp arms comprises a retaining portion configured to retain the container;
    a prestressing element configured to prestress each retaining portion of the two clamp arms towards one another; and
    a clamp carrier comprising two guide elements,
  wherein:
    the two clamp arms are displaceable along a distance between the retaining portions via the guide elements,
    each of the two guide elements is guided in a slidingly displaceable manner in a respective guide groove of the clamp carrier,
    the prestressing element comprises an elastic spring bracket extending longitudinally from one clamp arm to the other clamp arm, and the elastic spring bracket and the two clamp arms extend in a single plane, and
    the elastic spring bracket is attached to each of the two clamp arms between each retaining portion and an attachment portion, or
    the elastic spring bracket is attached to each of the two clamp arms in a region of each retaining portion.

2. The clamp device of claim 1, wherein the two clamp arms and the prestressing element are formed as one piece.

3. The clamp device of claim 1, wherein each of the two clamp arms is attached to the guide elements via a pin connection.

4. The clamp device of claim 1, further comprising an actuating unit configured to actively move the retaining portions of the two clamp arms in relation to the prestressing.

5. The clamp device of claim 4, wherein the two clamp arms and the actuating unit extend in a single plane.

6. The clamp device of claim 4, wherein the actuating unit comprises a displaceable actuating member, and displacement of the displaceable actuating member causes displacement of the two clamp arms.

7. The clamp device of claim 6, wherein a displacement direction of the displaceable actuating member is transverse in relation to the displacement direction of the two clamp arms.

8. The clamp device of claim 6, wherein the displaceable actuating member is coupled to each of the two clamp arms via a coupling member that is arranged in a pivotable manner on the displaceable actuating member and in a pivotable manner on each of the two clamp arms.

9. The clamp device of claim 8, wherein each coupling member is arranged in a pivotable manner on each guide element.

10. The clamp device of claim 6, wherein the retaining portions are prestressed at a predetermined distance from one another, the predetermined distance corresponds to an open position of the retaining portions, and the retaining portions are configured to be moved into a closed position by displacement of the displaceable actuating member.

11. The clamp device of claim 6, wherein the retaining portions are prestressed at a predetermined distance from one another, the predetermined distance corresponds to a closed position of the retaining portions, and the retaining portions are configured to be moved into an open position by displacement of the displaceable actuating member.

12. The clamp device of claim 6, wherein the displaceable actuating member comprises an interaction element, the interaction element comprises a roller, and the interaction element is arranged on a side of the displaceable actuating member that is directed away from the two clamp arms.

13. The clamp device of claim 1, wherein the elastic spring bracket comprises a stiffening element configured to stiffen a central region of the elastic spring bracket.

14. The clamp device of claim 1, wherein the elastic spring bracket further extends around the two clamp arms.

15. The clamp device of claim 1, wherein each retaining portion of the two clamp arms is formed on an end of a respective clamp arm.

16. The clamp device of claim 1, wherein the elastic spring bracket is attached to each of the two clamp arms between each retaining portion and an attachment portion.

17. The clamp device of claim 1, wherein a displacement direction of the two guide elements is parallel to the distance between the retaining portions.

18. A container-handling apparatus comprising:
a transporting apparatus configured to transport a container, wherein the transporting apparatus comprises a clamp device, the clamp device comprising:
two clamp arms, wherein each of the two clamp arms comprises a retaining portion configured to retain the container;
a prestressing element configured to prestress each retaining portion of the two clamp arms towards one another; and
a clamp carrier comprising two guide elements,
wherein:
the two clamp arms are displaceable along a distance between the retaining portions via the guide elements,
each of the two guide elements is guided in a slidingly displaceable manner in a respective guide groove of the clamp carrier,
the prestressing element comprises an elastic spring bracket extending longitudinally from one clamp arm to the other clamp arm, and the elastic spring bracket and the two clamp arms extend in a single plane, and
the elastic spring bracket is attached to each of the two clamp arms between each retaining portion and an attachment portion, or
the elastic spring bracket is attached to each of the two clamp arms in a region of each retaining portion.

19. The container-handling apparatus of claim 18, wherein the elastic spring bracket further extends around the two clamp arms.

20. The container-handling apparatus of claim 18, wherein each retaining portion of the two clamp arms is formed on an end of a respective clamp arm.

* * * * *